3,487,083
PREPARATION OF 4-HYDROXY-
PYRAZOLO[3,4-d]PYRIMIDINE
Ronald M. Cresswell, Scarsdale, and Melvin Schnapper,
Yonkers, N.Y., assignors to Burroughs Wellcome & Co.
(U.S.A.) Inc., Tuckahoe, N.Y.
No Drawing. Filed July 6, 1967, Ser. No. 651,393
Claims priority, application Great Britain, July 14, 1966,
31,690/66
Int. Cl. C07d 51/42, 49/18; A61k 27/00
U.S. Cl. 260—256.4          3 Claims

ABSTRACT OF THE DISCLOSURE

This invention relates to an improved method of preparing 4-hydroxypyrazolo (3,4-d) pyrimidine, (allopurinol) a drug useful in the treatment of hyperuricemia associated with gout and other conditions. In particular, this invention relates to an improved method of preparing amino methylene cyano-acetamide by reacting formamidine base with cyano-acetamide in water or a lower alcohol and then converting the amino methylene cyano-acetamide with hydrazine to form 3-amino pyrazole - 4-carboxamide which may then be converted to allopurinol.

---

This invention relates to an improved method of preparing 4-hydroxypyrazolo (3,4-d) pyrimidine (allopurinol) and intermediates useful in the preparation of allopurinol.

Allopurinol is a drug useful in the treatment of hyperuricemia in humans associated with gout and other conditions. Allopurinol is also useful in inhibiting the enzymatic oxidation of mercaptopurine and other purine drugs.

Allopurinol is generally administered to human patients in tablet form. Dosages of 200 to 300 mg. per day divided into two or three doses is recommended for treatment of mild gout and dosages of 400 to 600 mg. per day is recommended for treatment of those having moderately severe tophaceous gout.

The compound 4-hydroxypyrazolo (3,4-d) pyrimidine (Formula I)

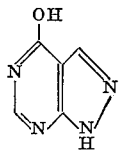
(I)

has previously been prepared by preparing ethoxy methylene malononitrile II

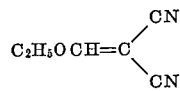
(II)

which was reacted with hydrazine III $$H_2N-NH_2 \quad (III)$$

to form IV (see U.S. Patent 2,759,949)

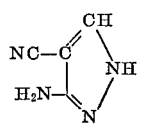
(IV)

The compound (IV) is then hydrolyzed to form 3-amino pyrazole-4-carboxamide (V).

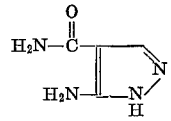
(V)

The compound V is then reacted with formamide (VI)

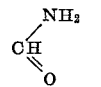
(VI)

to prepare the Compound I.

The prior art has also disclosed an alternate method of preparing allopurinol (I) which comprises reacting ethoxy methylene cyano-acetic ester (VII)

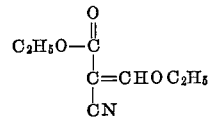
(VII)

with hydrazine III to produce VIII

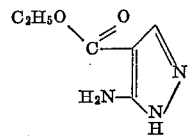
(VIII)

which is then reacted with formamide (VI) to provide I.

The above mentioned prior art methods have been used to produce allopurinol. The allopurinol so produced by the prior art has been contaminated with various pyridine derivatives etc. which are rather insoluble and which tend to be yellow in color. Their presence is readily detectable through their absorption spectrums (U.V. and visible).

Since allopurinol is a drug which is continuously used by chronically ill patients, objectionable side products can not be tolerated. These side products must be removed by using costly and tedious procedures in order to provide a drug product which is acceptable for distribution.

In view of the above, it is the principal object of this invention to provide new and improved methods for preparing allopurinol and intermediates necessary for the preparation thereof in a highly pure state such that very little purification of the end product is necessary.

This invention provides the carboxamide V intermediate in high yield (80%) and in high purity without any necessary isolation of intermediates during further processing. None of the prior art methods offer these advantages.

The new process of this invention comprises two steps, A and B, which can, in fact, be telescoped into one continuous operation. Step A comprises reacting the known formamidine base IX

(IX)

with the known cyanoacetamide X

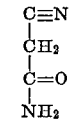
(X)

to produce 3-amino-2-cyano acrylamide XI

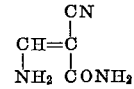
(XI)

The β-amino-α-cyano acrylamide of Formula XI has been prepared before by other types of reactions. However, the present reaction is remarkable as proceeding rapidly at or even below room temperature (preferably at 5° to less than about 30° C.). It is possible that the mechanism is:

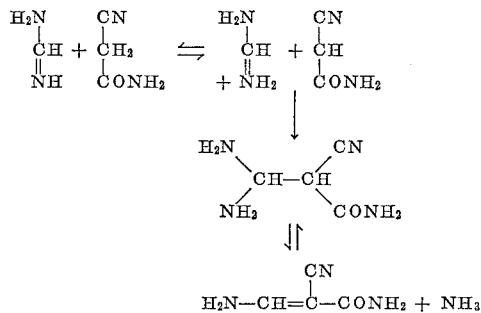

The basicity of formamidine and the acidity of cyanoacetamide are consistent with the presence concurrently of working concentrations of the cation of the former and the anion of the latter. The speed and smoothness of the reaction is such as to suggest an ionic process since it appears to have a very low energy of activation.

The solvent for this step can be water or a lower alcohol, i.e. methanol, ethanol, propanol, butanol. The reaction is slightly faster in water and indeed is appreciably exothermic at room temperature. However, the product obtained in alcohol is preferable for our purpose and consequently it is preferred to run the reaction in alcohol.

Step B consists of reaction of the amino cyano acrylamide (XI) formed in Step A with hydrazine (III) in the sense:

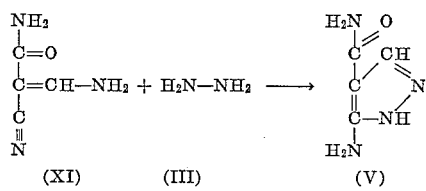

to produce 3-amino pyrazole-4-carboxamide (V). A salt of V is generally prepared by adding an acid solution to produce the salt. Mineral acids such as sulphuric, hydrochloric etc. may be used with sulphuric acid and the sulphate salt prepared therefrom being preferred.

This step can be performed on the isolated aminocyano acrylamide or the two steps can be combined in one operation which, in practice, is preferred. The separate steps A and B are described in Examples 1 and 2; Example 3 describes the combined operation. Thereafter the compound Allopurinol (I) can be prepared by reacting (V) or a salt thereof with formamide (VI). Example 4 illustrates the preparation of 4-hydroxy pyrazolo pyrimidine from a salt of V.

It should be understood that it is unnecessary to isolate the amino cyano acrylamide XI with this invention. Cyclization to Allopurinol can be effected by heating with formic acid or formamide alone or with the two in combination which is a faster and the preferred route.

All temperatures given in the examples are in degrees centigrade.

EXAMPLE 1

3-amino-2-cyano acrylamide

To a solution of sodium methylate (5.94 grams) in ethanol (50 ml.) was added formamidine hydrochloride (10.0 grams) and the mixture was stirred at room temperature for 15 minutes. The mixture was then filtered free of salt.

To the filtrate was added cyanoacetamide (8.4 grams) and the reaction mixture was stirred at room temperature for 1 hour. The 3-amino-2-cyano-acrylamide that separated was collected and washed with ethanol (25 ml.), weight=7.6 grams. The filtrate on cooling to 5° C. yielded a further 1 gram of product. Total weight=8.6 grams (77.5%); M.P. 185–186° C.; lit[2] M.P. 182–3° C.

EXAMPLE 2

To a suspension of 3-amino-2-cyano acrylamide (24.5 grams) in water (100 ml.) was added 85% technical hydrazine hydrate (13 grams) and the stirred mixture was heated rapidly to 70–80° on a steam bath. The reaction was held at that temperature for 15 minutes and then allowed to cool to 25° C. At 25° C. the reaction was acidified by the addition of a solution made from concentrated sulphuric acid (20 ml.) and ice (50 grams). The acidified reaction was cooled to 5° C. and the product collected and recrystallized from water (350 ml.) with charcoal (3.3 grams) treatment. The white crystalline 3-amino pyrazole-4-carboxamide sulphate was collected and washed with water (2× 50 ml.; 5° C.), acetone (2× 100 ml.) and dried in vacuo at 60° C. Weight=28 grams; yield=72.5%; M.P. 229–232° (decomp.).

EXAMPLE 3

3-amino pyrazole-4-carboxamide sulphate

To a soltuion of sodium methylate (6 grams) in ethanol (75 ml.) was added formamidine hydrochloride (10 grams) followed immediately by cyanoacetamide (8.4 grams). The reaction was stirred at 25° C. for 3 hours and then heated to 70°. At 70° a solution of 85% technical hydrazine hydrate (6 grams) in water (50 ml.) was added and after a further 15 minutes at 70° C. the reaction mixture was allowed to cool to 25° C. At 25° C. the reaction was acidified by the addition of a solution made from concentrated sulphuric acid (6 ml.) and on ice (30 grams). The acidified reaction mixture was cooled to 5° C. and the crystalline product collected and recrystallized from water (175 ml.) with charcoal treatment. The white crystalline 3-amino pyrazole-4-carboxamide sulphate was collected and washed with water (50 ml.; 5° C.) and acetone (2× 50 ml.) and dried in vacuo at 60° C. Weight=12.5 grams; yield=71.5%; M.P. 230–233° (decomp.).

EXAMPLE 4

4-hydroxy pyrazolo (3,4-d) pyrimidine

A suspension of 3-amino pyrazole-4-carboxamide sulphate (10.4 grams) in 90% formic acid (10.5 ml.) and formamide (25 ml.) was stirred and heated to 145° C. (At 110° C. complete solution is observed for a short period and thereafter a gradual precipitation occurs). The reaction was held at 145° C. for 3 hours. The reaction mixture was then cooled to 5° C. and the product collected and washed with water (50 ml.) and acetone (2× 50 ml.). Weight of crude product=6.2 grams. The crude product was recrystallized by dissolution in a solution made from sodium hydroxide (2.34 grams) in water (106 ml.) with treatment at 70° with charcoal (0.32 gram), followed by re-precipitation by the addition of concentrated hydrochloric acid to pH 5. The product was collected and washed with cold water (2× 50 ml.) acetone (2× 50 ml.) and dried in vacuo at 60° C. Weight=5.8 grams. Yield=72%.

What is claimed is:

1. The method of preparing 4-hydroxypyrazolo (3,4-d) pyrimidine comprising the steps of (a) mixing formamidine base and cyanoacetamide in at least about equal molecular amounts in water or a lower alcohol as the solvent at a temperature of less than about 30° C. to prepare 3-amino-2-cyano acrylamide, (b) mixing hydrazine with 3-amino-2-cyano acrylamide to prepare 3-amino pyrazole-4-carboxamide or a salt thereof and (c) mixing 3-amino pyrazole-4-carboxamide or a salt thereof with formic acid, formamide or a combination thereof to prepare 4-hydroxypyrazolo [3,4-d] pyrimidine.

2. The method of claim 1 wherein 3-amino-2-cyanoacrylamide is not isolated from the mixture prior to mixing hydrazine therewith.

3. The method of claim 1 wherein 3-amino-2-cyanoacrylamide is isolated from the mixture prior to mixing hydrazine therewith.

References Cited

UNITED STATES PATENTS 2,868,803   1/1959   Druey et al. _____ 260—256.4

OTHER REFERENCES

Elderfield, Heterocyclic Compounds, vol. 5, Wiley, 1957, pp. 64–6.

Huffman et al., Chem. Abstracts, 1962, vol. 57, col. 829.

Smolin et al., s-Triazines, Interscience, 1959, pp. 9–13.

ALEX MAZEL, Primary Examiner

R. J. GALLAGHER, Assistant Examiner

U.S. Cl. X.R.

104—251; 260—465.4, 310